United States Patent [19]

Jahnke et al.

[11] Patent Number: 5,059,382

[45] Date of Patent: Oct. 22, 1991

[54] METHOD OF RENOVATING THE CONTROL SYSTEM FOR CONTROLLING CONTROL CLUSTERS IN A NUCLEAR REACTOR, AND A CORRESPONDING CONTROL SYSTEM

[75] Inventors: Serge Jahnke, Paris; Philippe Ple, Nanterre, both of France

[73] Assignee: Framatome, Courbevoie, France

[21] Appl. No.: 296,817

[22] Filed: Jan. 13, 1989

[30] Foreign Application Priority Data

Jan. 13, 1988 [FR] France .................. 88 00313

[51] Int. Cl.$^5$ .............................................. G21C 7/36
[52] U.S. Cl. .................................. 376/215; 376/216; 376/228
[58] Field of Search .............. 376/215, 216, 217, 228

[56] References Cited

U.S. PATENT DOCUMENTS

| | | | |
|---|---|---|---|
| 4,125,432 | 11/1978 | Brooks, Jr. et al. | 376/215 |
| 4,236,220 | 11/1980 | Kogami | 376/217 |
| 4,363,778 | 12/1982 | Abbott | 376/228 |
| 4,777,010 | 10/1988 | Sato | 376/215 |

FOREIGN PATENT DOCUMENTS 2407603  5/1979  France .

OTHER PUBLICATIONS

8047 IEEE Transactions on Power Apparatus and Systems-vol.PAS-102 (1983), Jan., No. 1, New York, U.S.A.

"Control and Instrumentation of Large Nuclear Power Stations a Review of Future Trends" pp. 481-515 M. W. Jervis, M.Sc., Tech., C. Eng., F.I.E.E. IEE Proceedings, vol. 131, Pt. A. No. 7, Sep. 1984.

*Primary Examiner*—Donald P. Walsh
*Attorney, Agent, or Firm*—Pollock, Vande Sande & Priddy

[57] ABSTRACT

Control clusters, each of which comprises a plurality of neutron-absorbing rods, are operable by means of electromagnetic mechanisms whose coils are powered by power bridges driven from a control desk (11). The control system includes a controlling hard-wired logic circuit (12) serving the desk and supervising a plurality of hard-wired logic interfaces each of which serves a subgroup (10) of electromagnetic mechanisms for a determined number of clusters. The static power assemblies (9) each including a hard-wired logic interface and the power bridges of the subgroup(s) (10) served thereby are successively and independently replaced by at least one electronic power assembly (23) constituted by a computer and the power bridges of a subgroup served thereby.

2 Claims, 3 Drawing Sheets

METHOD OF RENOVATING THE CONTROL SYSTEM FOR CONTROLLING CONTROL CLUSTERS IN A NUCLEAR REACTOR, AND A CORRESPONDING CONTROL SYSTEM

FIELD OF THE INVENTION

The invention relates to a method of renovating the control of control clusters in a nuclear reactor provided with such clusters, and also to a control system for implementing the method.

BACKGROUND OF THE INVENTION

Nuclear reactors using ordinary water under pressure for producing electrical power include control clusters each of which comprises a plurality of neutron-absorbing rods. These rods serve to modulate the power provided by the reactor as a function of the degree to which they are inserted into the reactor core. Each control cluster is provided with an operating mechanism which is placed on the reactor vessel and which serves to displace the cluster vertically relative to the vessel. The operating mechanism associated with each cluster is of the actuator type and provides step-by-step displacement. It comprises three electromagnetic windings selectively powered by a corresponding number of feed bridges, referred to as power bridges. These bridges are collected together in static power assemblies which are controlled from a control desk via a control logic circuit which acts on the feed bridges via logic interfaces placed in the static power assemblies. For safety reasons, the equipment, and in particular its static power assemblies, is provided in the form of a plurality of units which are independent from one another.

In some of the power-producing nuclear reactors in service, the control logic circuit and the logic interfaces are provided in hard-wired form, whereas in more modern reactors the control logic circuits and the logic interfaces are provided in programmed form.

Hard-wired logic circuits do not have the same flexibility as programmed logic circuits when operating changes become necessary. When modifying, maintaining, or repairing hard-wired logic circuits, the equipment associated therewith needs to be taken out of service for on-site manual operations which take periods of time that bear no comparison with the time required for such circuit card swapping as may be necessary in equivalent programmed logic circuits.

This is particularly important in power-producing nuclear reactors where shut-downs should be kept to a minimum, both in duration and in quantity.

The necessary operations are therefore to be performed in as short a time as possible during the obligatory shut-down periods programmed for such reactors.

SUMMARY OF THE INVENTION

To this end, the invention provides a method of renovating the control system for controlling control clusters in a reactor provided with such clusters which are operated by means of electromagnetic mechanisms whose coils are powered by power bridges from a control desk via said control system, said control system including a controlling hard-wired logic circuit serving the desk and supervising a plurality of hard-wired logic interfaces each of which serves at least one subgroup constituted by the electromagnetic operating mechanisms of a determined number of simultaneously operable clusters.

According to a characteristic of the invention, each static power assembly constituted by a hard-wired logic interface and the power bridges of at least one subgroup served thereby is successively and independently replaced by at least one electronic control assembly constituted by a computer and the power bridges of a subgroup served thereby, said computer being interconnected via peripheral circuits with the power bridges and the controlling hard-wired logic in a manner which simulates a hard-wired logic interface.

The invention also relates to a control system for control clusters of a nuclear reactor obtained by partially implementing the above-defined method.

According to another characteristic of the invention, this control system comprises, in parallel, firstly static power assemblies each constituted by a hard-wired logic interface and the power bridges served thereby, and secondly electronic control assemblies each constituted by a computer and the power bridges of a subgroup, the computer of each electronic control assembly being interconnected like a hard-wired logic interface via peripheral circuits, firstly to the power bridges, and secondly to the controlling hard-wired logic circuit, thereby enabling the reactor to operate normally while its control system is being renovated between shut-down periods during which it is possible to replace static power assemblies by electronic control assemblies.

BRIEF DESCRIPTION OF THE DRAWINGS

The invention will now be described with reference to the attached drawings, in which an embodiment of the invention is shown for purposes of illustration, and in which.

DESCRIPTION OF PREFERRED EMBODIMENT

Figure 1:
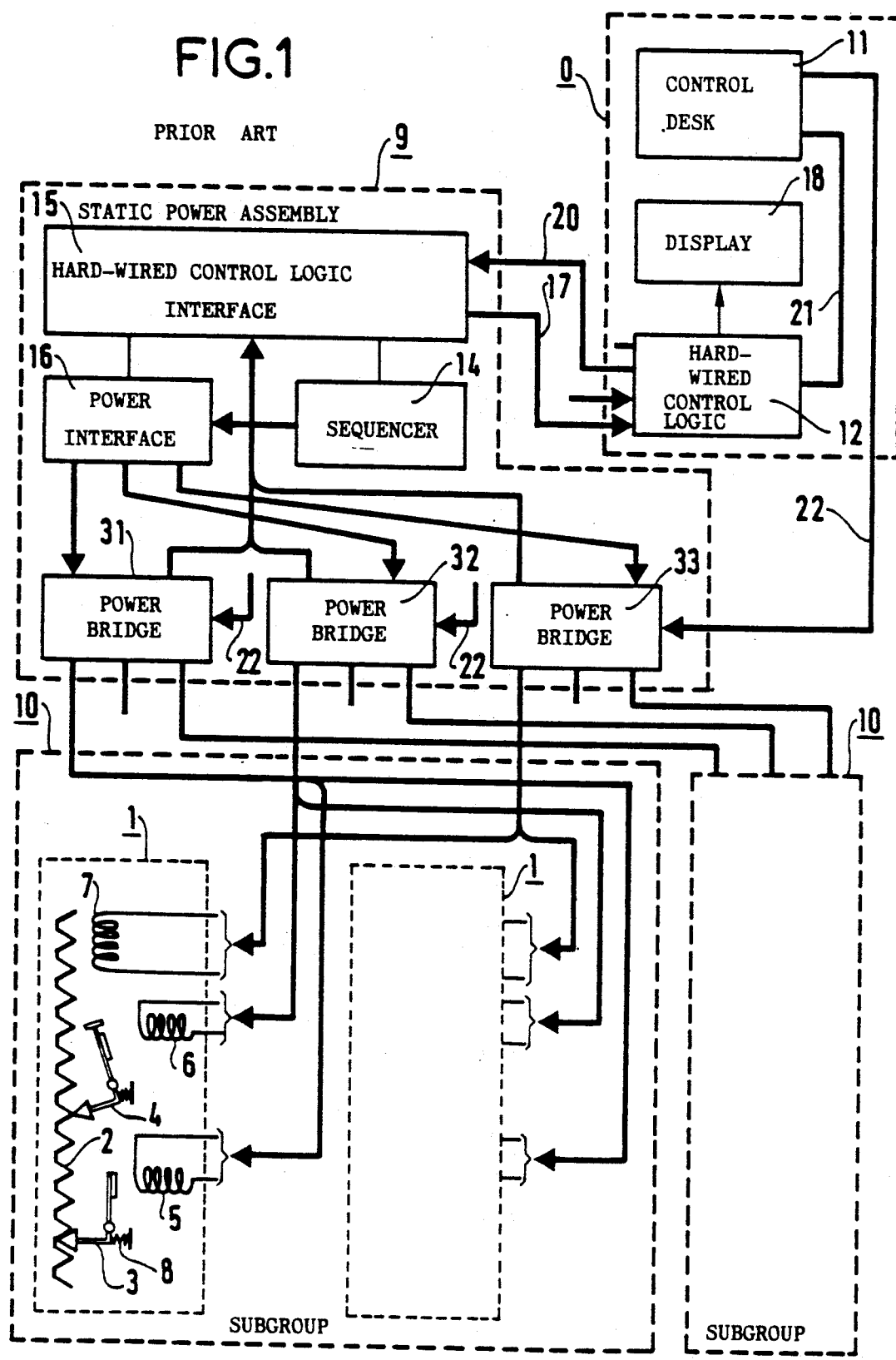
FIG. 1 shows a prior art system for controlling the control clusters of a nuclear reactor.

The system for controlling the control rods of an ordinary pressurized water nuclear reactor shown in FIG. 1 is the system used in currently operating nuclear reactors. Reference can be made, for example, to the article entitled "Genie Nuclaire/Technologie de Construction/Equipement du Coeur" published by M. P. Boiron in 1977 in the collection "Techniques de L'Ingenieur" for further details not given herein concerning the device being controlled.

In conventional manner, such stations include a large number of absorbent rods assembled in independent clusters.

Each cluster is provided with an electromagnetic operating mechanism 1 for displacing it vertically relative to the reactor vessel above which it is situated and into which the absorbent rods of the cluster penetrate.

Each electromagnetic mechanism 1 is of the stepper type comprising a rack 2 which is vertically displacable in translation relative to the reactor vessel under the control of pawls 3 and 4 which are actuated by electromagnets 5, 6, and 7. The pawls are of two types: some of them, 3, oscillate about are also vertically displacable in translation.

The fixed axis pawls 3 are conventionally disposed at 120° intervals around the rack 2 at a common horizontal level situated beneath the level of the moving pawls 4, with only a portion of the rack 2 and one each of the pawls 3 and 4 being shown in FIG. 1. Powering the electromagnet 5 thrusts pawls 3 to the bottom of a notch in the rack 2, thereby preventing it from moving in translation. When the electromagnet 5 receives insufficient power, the fixed pawl 3 releases and returns to a retracted position under the action of a traction spring 8, thereby leaving the rack 3 free to move since its teeth are no longer engaged. The electromagnet 6 acts on the moving pawl 4 in the same way as electromagnet 5 acts on the fixed pawl 3.

The electromagnet 7 acts vertically on the moving pawl 4 in particular when the moving pawl is urged into a notch in the teeth of the rack, and is then suitable for raising the moving pawl and thus the rack and the cluster attached thereto, when suitably powered simultaneously with the electromagnet 6 being powered. Releasing the electromagnet 7 when the pawl is in its high position and in a notch in the teeth of the rack 2, allows the rack to move down one step.

The process of controlling a rack 2 therefore implies powering the electromagnets 5, 6, and 7 selectively in a given cycle which is different depending on whether there is a request to raise or to lower the cluster fixed to the rack.

In the embodiment under consideration, four electromagnetic mechanisms 1 are simultaneously controlled through a unit referred to as a static power assembly 9 which is suitable for controlling three subgroups 10 each having four mechanisms 1 each serving a single control cluster.

A control desk 11 allows for the electromagnets 5, 6, and 7 of the various operating mechanisms 1 to be driven manually and/or automatically. To this end, the control desk 11 is associated with a hard-wired control logic circuit 12 which is connected to the various static power assemblies 9 that share the powering of the plurality of electromagnet mechanisms 1 in the nuclear reactor under consideration. Only one static power assembly 9 and only one of the mechanisms powered thereby are shown in FIG. 1.

A static power assembly 9 essentially comprises:

feed or "power" bridges 31, 32, and 33 for the electromagnets 5, 6, and 7 of the operating mechanisms 1 served by said assembly;

a sequencer 14 for organizing the sequence in which the electromagnets are powered over a period of time in order to raise or to lower the absorbent rods in the clusters of a subgroup;

a hard-wired logic control interface 15 for transmitting control and reporting information between the static power assembly under consideration and the hard-wired control logic; and a power interface 16 providing the signal transformations required between the hard-wired logic interface 15 and the power bridges 31, 32, and 33.

The power bridges are grouped together as a function of the role performed by the electromagnets which they power.

A first group of three power bridges 31 powers the electromagnets 5 that actuate the fixed pawls 3 of three subgroups 10 under the control of the static power assembly 9 under consideration. Second and third groups of three power bridges 32 and 33 have the same function respectively for the electromagnets 6 actuating the moving pawls 4 of the three subgroups considered above, and for the electromagnets 7 that displace the moving pawls 4.

The switching on, the regulation if so required, and the switching off of the electrical currents feeding the electromagnets 5, 6, and 7 of the three subgroups 10 under consideration are all selectively provided by the power interface 16 which receives commands for this purpose from the sequencer 14 which sequences the various operations.

The sequencer 14 and the power interface are supervised by the controlling hard-wired logic 12 via the hard-wired logic interface 15. The interface processes, in particular, faults concerning both the logic and the power portions of the static power assembly 9 of which it is a part, and transmits fault signalling to the controlling hard-wired logic 12 over a link 17. The controlling hard-wired logic 12 also receives, over the same link 17, display indications from the hard-wired logic interface 15 and concerning the static power assembly. It forwards these indications to be displayed on a display equipment 18 connected to the hard-wired logic 12 and associated with the control desk 11 in the nuclear reactor control room O.

The controlling hard-wired logic 12 forwards commands coming from the control desk 11 to the various hard-wired logic interfaces such as the interface 15, over a multi-wire link 20.

To this end, it is connected to the desk 11 via a multi-wire link 21. The subgroup selection operations are performed by the controlling hard-wired logic 12 which provides a display on the display equipment on the basis of information collected at the power bridges 31, 32, and 33. The operations of resetting the control rods 1 are performed by direct action from the desk on the power bridges which act on the electromagnets 5, 6, and 7 via a link 22.

As mentioned above, the controlling hard-wired logic and the hard-wired logic interfaces are generally incapable of being modified except during the periods for which the reactor is shut down.

If it is possible to make modifications during programmed down periods of the reactor, then it need not be stopped for the specific purpose of making the modifications. In the present case, the time required is such that it is not possible to completely renovate the system for controlling a reactor's control clusters in a single stage.

Figure 2:
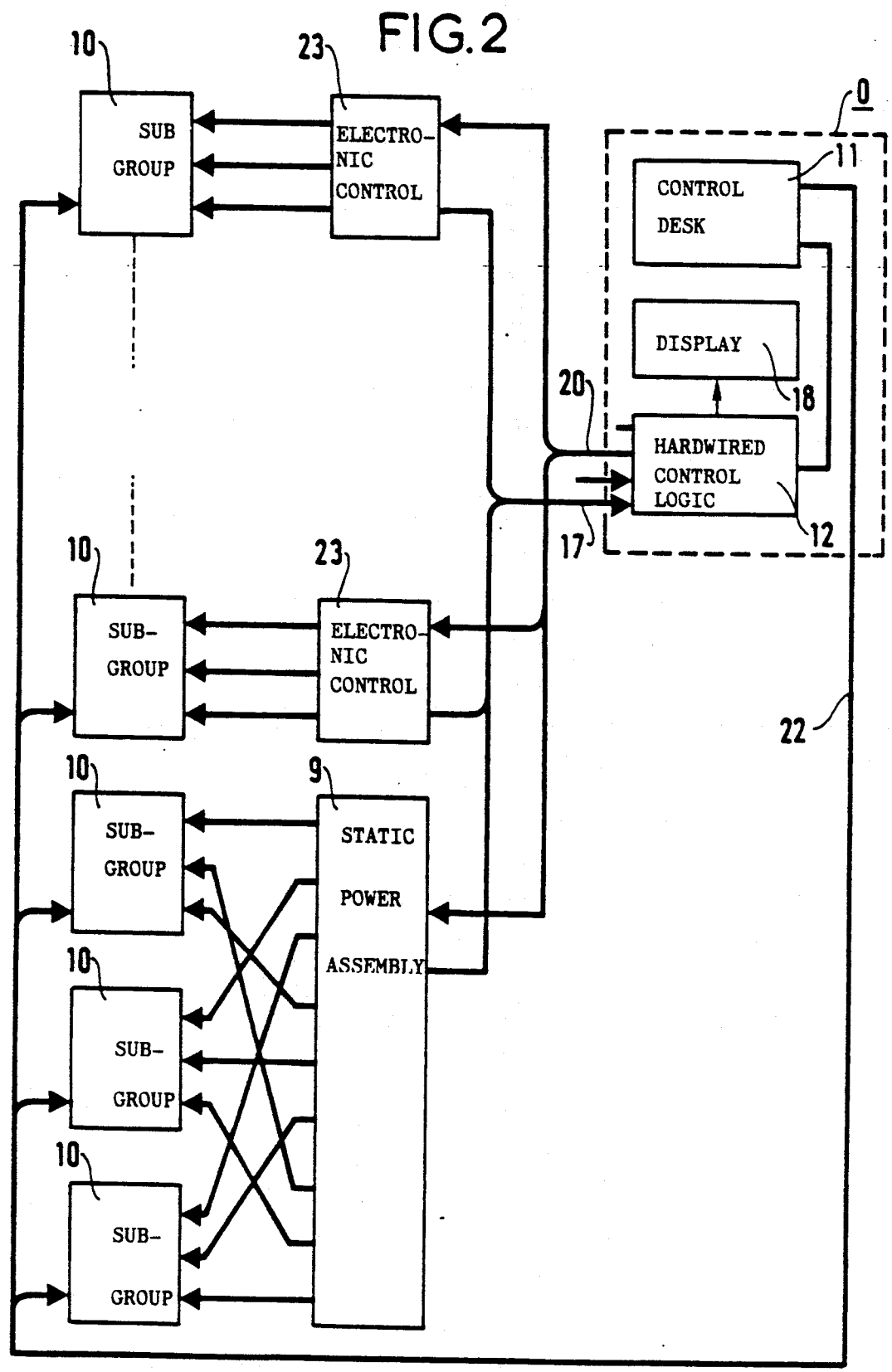
FIG. 2 is a diagram of a system for controlling control clusters which is partially renovated in accordance with the method of the invention.

As a result, arrangements are made in accordance with the invention to obtain an organization for controlling the clusters of a reactor during renovation such as that shown symbolically in FIG. 2.

To this end, an electronic control assembly 23 is successively interposed between each subgroup 10 and the hard-wired control logic which supervises it, as a replacement for the static power assembly 9 which was previously used to drive the subgroup 10.

In a preferred embodiment of the invention, the cabinet (not shown) containing a static power assembly 9 that has been in service so far, is emptied during a programmed reactor shut-down without performing any modification to the cabling between said cabinet and firstly the subgroups 10 that used to be served by said static power assembly, and secondly the controlling hard-wired logic 12. A portion of the space made available in the cabinet is then filled with three electronic power assemblies 23 which are connected firstly to the cable links 17 and 20 connected to the controlling hard-wired logic 12, and secondly to a respective one of the subgroups 10 that were previously served by the removed static power assembly 9.

During operating stages between reactor stops, while cluster control is in the process of being renovated, the reactor includes some subgroups which are supervised by the controlling hard-wired logic 12 via electronic control assemblies 23 and others which are supervised via static power assemblies 9.

Figure 3:
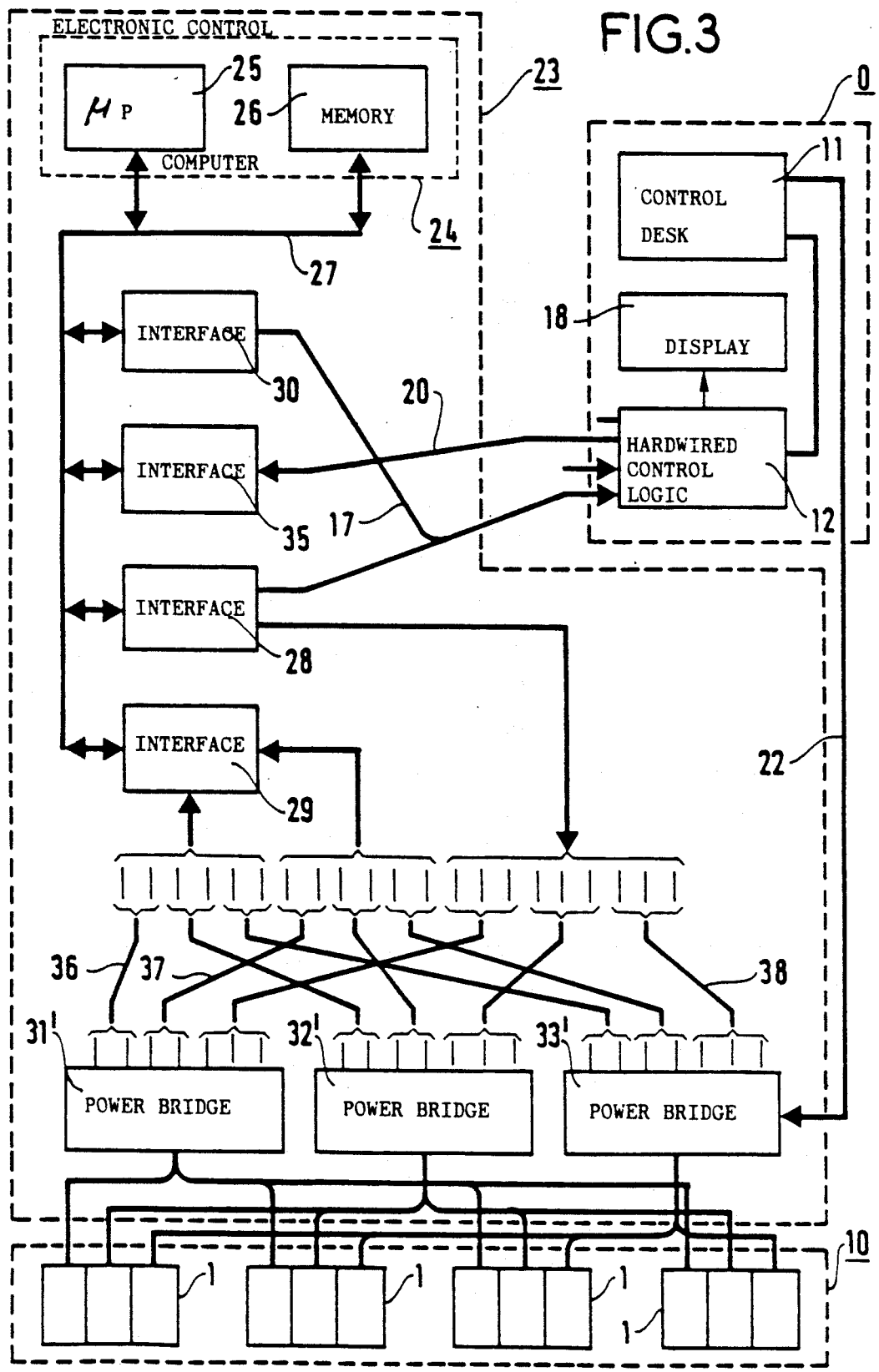
FIG. 3 shows a system for controlling control rods in a nuclear reactor which has been fully renovated in accordance with the invention.

In the proposed embodiment, as shown in FIG. 3, an electronic control assembly 23 is organized about a computer 24 and its peripherals which enable it to serve as an interface between the power bridges of a subgroup 10 and the controlling hard-wired logic 12 of the reactor in question.

The power bridges 31', 32', and 33' required are identical with the power bridges 31, 32, and 33 which they replace, or are preferably improvements thereover; they are intended to provide the same operations on the same coils of the electromagnets 5, 6, and 7 as before.

The computer 24 is conventionally constituted by a commonly available processor 25 associated with read-only memory and working memory 26 with which it communicates via a bus 27. The microprocessor 25 communicates with the power bridges 31', 32', and 33' via output interface cards 28 and input interface cards 29 via the bus 27, and it also communicates with the controlling hard-wired logic 12 via a display interface card 30, an output interface card 29, and a logic interface card 35, or via the bus 27.

Commands coming from the desk 11 via the controlling hard-wired logic 12 are transmitted to the computer 24 over the multi-wire link 20 and the bus 27 via the logic interface card 35. The logic interface card 35 provides the signal matching required to enable the hard-wired logic to produce digital signals acceptable by the computer. The display interface card provides inverse matching for the signals which are transmitted over the link 17 to the controlling hard-wired logic 12, as does the output card 28 for signals such as fault-indicating signals which are transmitted over the link 17 to the same logic 12. The computer 24 replaces the sequencer 14 for sequencing the application of power to the electromagnets via the power bridges 31', 32', and 33'.

To this end, on receiving an order from the desk 11 via the controlling hard-wired logic 12, the computer 24 generates digital control signals for the output interface card 28 which transforms them into binary type signals intended for the power bridges 31', 32', and 33' and reaching them over links referenced 38. Over links referenced 37, the power bridges provide indications in analog form relating to the currents flowing through the electromagnet coils, and these indications are transmitted to the input interface card 29 which converts them into digital form for onward transmission to the computer 24 and/or to the controlling hard-wired logic 12 for processing and for being taken into account.

The input interface card 29 also receives on/off type indications which are transmitted by the power bridges, in particular in the event of faults or testing, and these indications are then transmitted over links 36 case.

The display card 30 enables information to be communicated to the operator via the controlling electronic assembly 23 which includes said card and via the controlling hard-wired logic 12 and the display members (not shown) included in the desk 11.

We claim:

1. A method of renovating a control system for controlling control clusters in a reactor provided with such clusters operated by electromagnetic mechanisms (1) having coils powered by power bridges (31, 32, 33) from a control desk (11) via said control system, said control system including a controlling hard-wired logic circuit (12) serving said desk and monitoring a plurality of hard-wired logic interfaces (15) each serving at least one subgroup (10) constituted by the electromagnetic operating mechanisms (1) of a determined number of simultaneously operable clusters, said method comprising successively and independently replacing each static power assembly (9) constituted by a hard-wired logic interface (15) and the power bridges (31, 32, 33) of at least one subgroup served thereby by at least one electronic control assembly (23) constituted by a computer and the power bridges (31', 32', 33') of a subgroup served thereby, said computer being interconnected via peripheral circuits (28, 29, 30, 35) with the power bridges and the controlling hard-wired logic in a manner which simulates a hard-wired logic interface.

2. A control system for controlling control clusters in a reactor provided with such clusters operated by means of electromagnetic mechanisms (1) whose coils are powered by power bridges (31, 32, 33) from a control desk (11) via a controlling hard-wired logic circuit (12) serving the desk and supervising a plurality of hard-wired logic interfaces (15) each of which serves at least one subgroup (10) constituted by a determined number of simultaneously operable clusters, said control system comprising, in parallel, (a) static power assemblies (9) each constituted by a hard-wired logic interface (15) and the power bridges (31, 32, 33) served thereby; and (b) electronic control assemblies (23) each constituted by a computer and the power bridges (31', 32', 33') of a subgroup (1), the computer of each electronic control assembly being interconnected like a hard-wired logic interface via peripheral circuits (28, 29, 30, 35), firstly to the power bridges, and secondly to the controlling hard-wired logic circuit, thereby enabling the reactor to operate normally while its control system is being renovated between shutdown periods during which static power assemblies are replaced by electronic control assemblies.

* * * * *